United States Patent
Rich et al.

(10) Patent No.: US 7,818,562 B2
(45) Date of Patent: Oct. 19, 2010

(54) METHOD AND APPARATUS FOR TIME SYNCHRONIZATION IN A NETWORK DATA PROCESSING SYSTEM

(75) Inventors: Bruce Arland Rich, Round Rock, TX (US); Xiaoyan Zhang, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 151 days.

(21) Appl. No.: 12/129,490

(22) Filed: May 29, 2008

(65) Prior Publication Data

US 2008/0244094 A1    Oct. 2, 2008

Related U.S. Application Data

(63) Continuation of application No. 11/134,707, filed on May 20, 2005, now abandoned.

(51) Int. Cl.
H04L 29/06  (2006.01)
H04L 9/32   (2006.01)

(52) U.S. Cl. .................. 713/150; 713/155; 713/165

(58) Field of Classification Search .................. 713/150
See application file for complete search history.

(56) References Cited

U.S. PATENT DOCUMENTS

| | | | |
|---|---|---|---|
| 5,500,897 A | 3/1996 | Hartman, Jr. | |
| 5,544,322 A | 8/1996 | Cheng et al. | |
| 5,921,938 A | 7/1999 | Aoyama et al. | |
| 5,968,133 A | 10/1999 | Latham et al. | |
| 5,978,918 A | 11/1999 | Scholnick et al. | |
| 6,023,769 A | 2/2000 | Gonzalez | |
| 6,028,939 A | 2/2000 | Yin | |
| 6,157,957 A | 12/2000 | Berthaud | |
| 6,175,920 B1* | 1/2001 | Schanze | 713/150 |
| 6,223,240 B1 | 4/2001 | Odenwald et al. | |
| 6,986,039 B1* | 1/2006 | Leah et al. | 713/155 |
| 2003/0123491 A1* | 7/2003 | Couillard | 370/508 |
| 2005/0210153 A1 | 9/2005 | Rich et al. | |
| 2005/0210306 A1 | 9/2005 | Rich et al. | |

OTHER PUBLICATIONS

Davis et al., "Kerberos with Clocks Adrift: History Protocols and Implementation", 1996 the USENIX Association, Computing Systems, vol. 9, No. 1, pp. 29-46.
IBM Technical Disclosure Bulletin, Jul. 1998, US, vol. 31, No. 2, p. 91, Christian, "Probabilistic Clock Synchronization".

* cited by examiner

*Primary Examiner*—Shin-Hon Chen
(74) *Attorney, Agent, or Firm*—Yee & Associates, P.C.; Jeffrey S. LaBaw

(57) ABSTRACT

A method, apparatus, and computer implemented instructions for synchronizing time in a network data processing system. A request for time synchronization is received at a target data processing system. A current target time at the target data processing system is placed in a reply. The reply is sent to the source data processing system. A current source time from when the reply is received at the source data processing system is compared to the current target time to generate a comparison. A synchronization factor is generated using the comparison.

33 Claims, 9 Drawing Sheets

METHOD AND APPARATUS FOR TIME SYNCHRONIZATION IN A NETWORK DATA PROCESSING SYSTEM

This application is a continuation of application Ser. No. 11/134,707, filed May 20, 2005, status pending.

BACKGROUND OF THE INVENTION

1. Technical Field

The present invention relates generally to an improved data processing system, and in particular to a method and apparatus for synchronizing time. Still more particularly, the present invention relates to a method and apparatus for synchronizing time for an authentication system in a network data processing system.

2. Description of Related Art

In a multi-user computer system, identification and authentication mechanisms are essential for identifying and authenticating each individual who requests any usage of system resources. One solution is known as "Kerberos". Originally developed at the Massachusetts Institute of Technology, Kerberos is a distributed authentication services that allows a client process running on behalf of a principal (e.g., a user) to prove its identity to a remote server without transmitting passwords over a potentially insecure network.

Kerberos requires principals to have secret keys registered with key distribution center (KDC) on the Kerberos server. A principal obtains a "ticket" from KDC to access the service on a remote server. To prevent attackers from intercepting and reusing the ticket, an authenticator, which includes a time stamp and other principal information, is presented along with the ticket in the request message to remote server.

The reason for time stamping the authenticator is to prevent a "replay attack". In a replay attack, a hacker eavesdrops on an authentication packet. The hacker can try to replay this packet to pretend that the hacker has the ticket and authority to access this service. To prevent this kind of attack, Kerberos allows the server to accept the authenticator only if the time stamp in the authenticator is within a limited time difference from the server's own clock, such as 5 minutes earlier or later than server's clock. This range provides a 10 minute time window. Therefore, in order to allow principals successfully being authenticated as well as to prevent replay attack, it is necessary to maintain a time synchronization (a margin of a few minutes is allowable) among principals and the Kerberos server.

Kerberos does not provide a time synchronization mechanism. Synchronization is assumed to be achieved outside the Kerberos system. The current approach is that the clocks of workstations and servers that participate Kerberos authentication are adjusted with the clock on Kerberos server manually or automatically using special time servers through another protocol such a simple network time protocol (SNTP). This approach has a couple of drawbacks. As Kerberos technology is being pushed to the Internet arena, it is more difficult to achieve clock synchronization among machines on different networks or in different geographical locations. Also, Kerberos supports cross-realm authentication. Cross-realm authentication allows a user to access services in other realms. This brings the necessity to be able to dynamically synchronize a principal's time with different servers' times. The current approach does not address this requirement.

Furthermore, a security hole may be introduced into the Kerberos system because this current approach relies on the clock settings of workstations. One example of a possible scenario is if a hacker changes clock settings on the hacker's workstation to move the time a few hours ahead, then the hacker waits for somebody to try authenticating from this machine and intercepts the authentication package sent. A few hours later, the hacker replays the intercepted package. Since the server will think that time stamp is within allowed boundaries of a few minutes, it accepts the service request, and the hacker successfully gains access to the service.

Therefore, it would be advantageous to have an improved method and apparatus for an improved time synchronization mechanism.

SUMMARY OF THE INVENTION

The present invention provides a method, apparatus, and computer implemented instructions for synchronizing time in a network data processing system. A request for time synchronization from a source data processing system is received at a target data processing system. A current target time at the target data processing system is placed in a reply. The reply is sent to the source data processing system. A current source time from when the reply is received at the source data processing system is compared to the current target time to generate a comparison. A synchronization factor is generated using the comparison.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
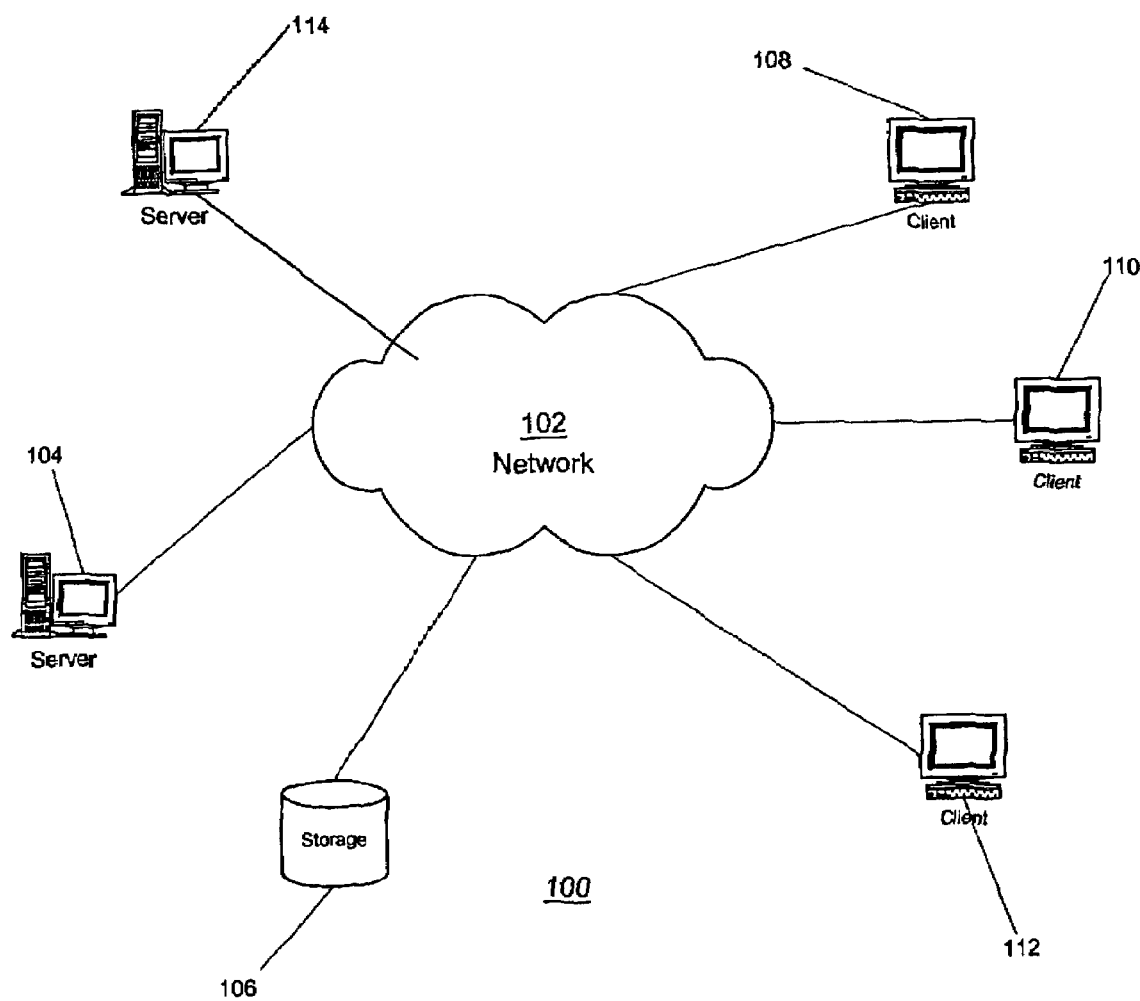
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 is a file server and provides data, such as boot files, operating system images, and applications to clients 108-112. Clients 108, 110, and 112 are clients to server 104. Server 114 is a key distribution center (KDC) server used to obtain keys for authentication by server 104. In the depicted examples, clients 108, 110, and 112 send requests to server 114 to generate synchronization factors used in authentication processes with server 104.

Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
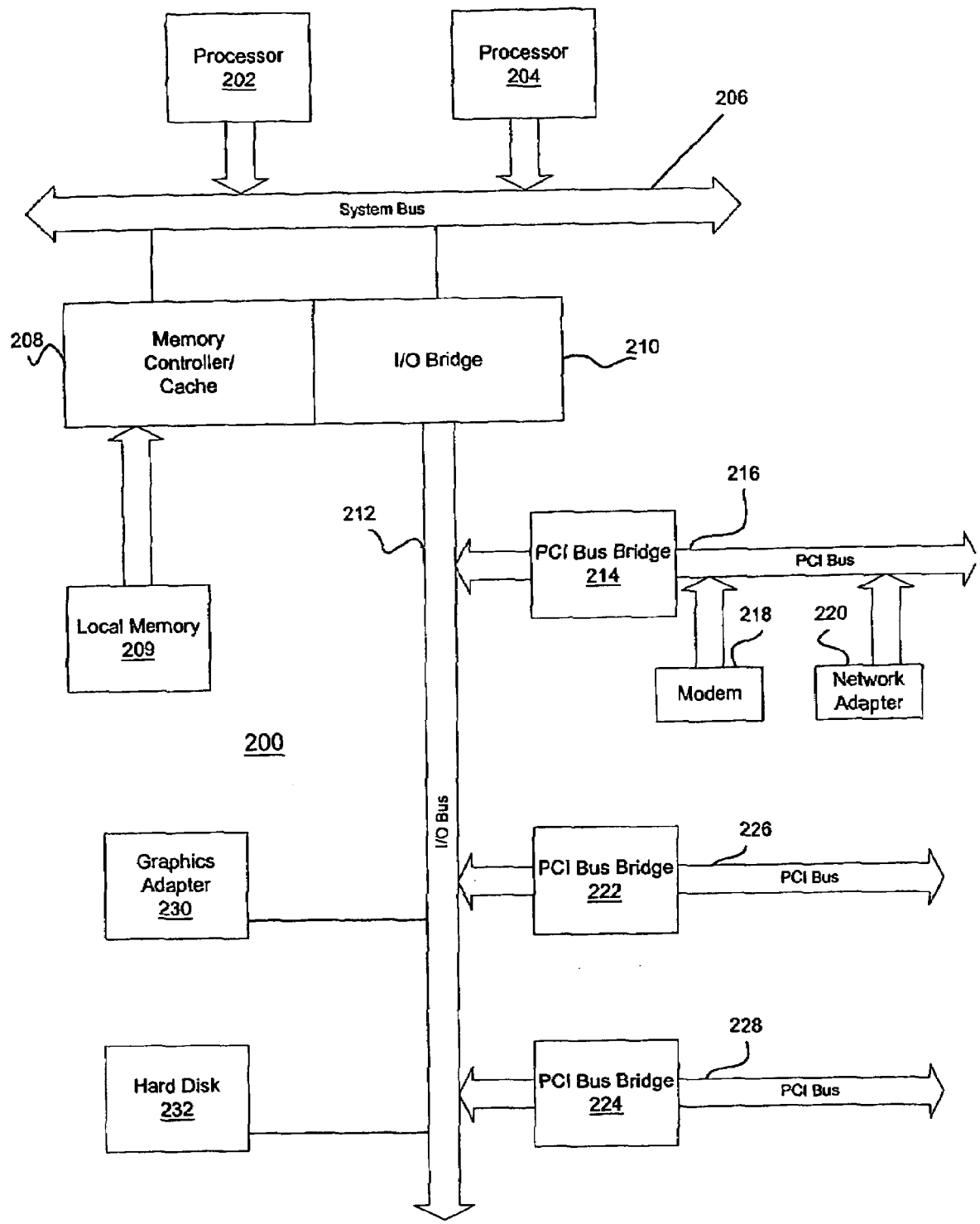
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
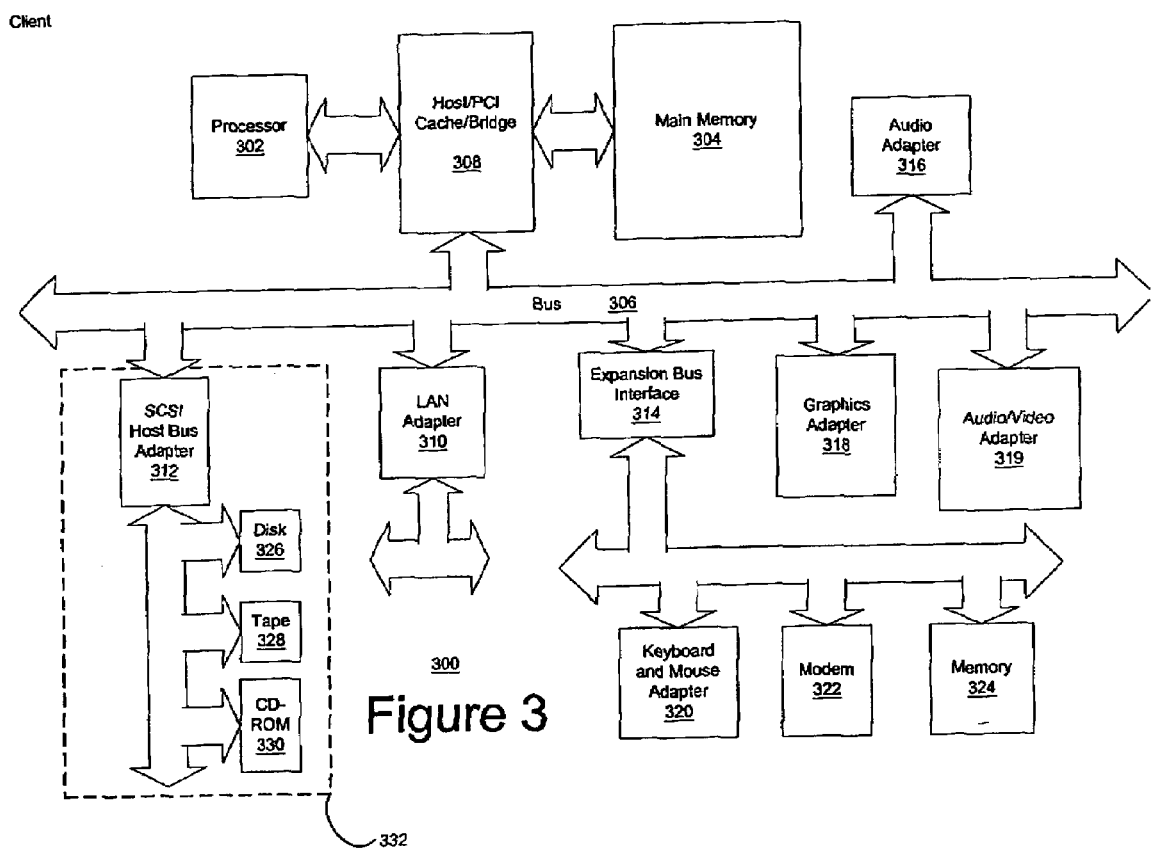
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer implemented instructions for synchronizing time. This synchronization mechanism is useful in authenticating a client in which the authentication mechanism uses a time stamp. The client sends a request for synchronization information from a target, such as a server. In this example, the server is a KDC server. In response to receiving a time synchronization response, the client calculates a clock skew between the KDC server and the client. Then, the client may request a user credential from another server, such as an authentication server using the calculated clock skew to adjust the time value or time stamp generated by the client. The file server and the KDC server may be located on the same physical computer or in different computers. Thus, this mechanism avoids having to change physical clock settings on a client.

Figure 4A:
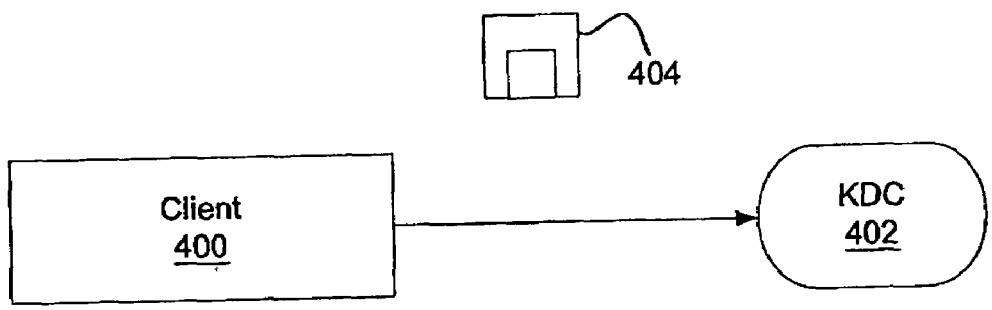
FIGS. 4A-4C are diagrams illustrating data flow used in authentication system in accordance with a preferred embodiment of the present invention.
Figure 4B:
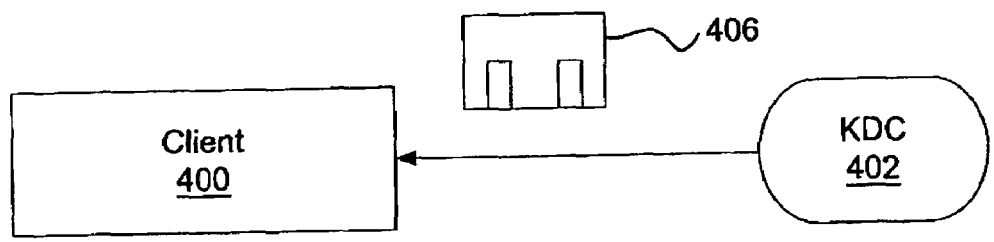
Figure 4C:
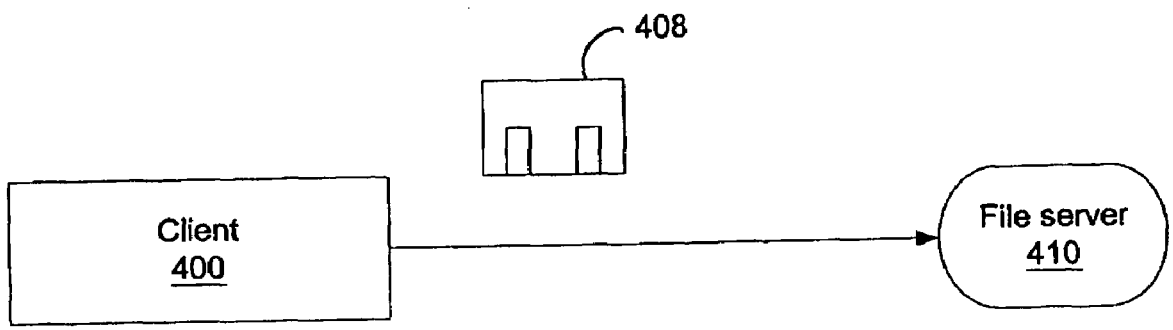

Turning next to FIGS. 4A-4C, diagrams illustrating data flow used in authentication system are depicted in accordance with a preferred embodiment of the present invention. In the depicted examples, client 400 may be implemented using data processing system 300 in FIG. 3 while KDC 402 may be implemented using data processing system 200 in FIG. 2.

In this example, in FIG. 4A, client 400 sends a request 404 to KDC server 402. Request 404 includes a time stamp, containing the current time, T1, at client 400 when request 404 is generated and sent. In FIG. 4B KDC server 402 generates a reply 406, which contains the current time, T2, at KDC server 402. This reply is encoded and the checksum is calculated over the encoding data. This checksum is added to the reply and the reply is re-encoded. These examples, the checksum is calculated use a secret key for the client. This allows the client to verify the data integrity of the reply. In these examples, the data is DER encoded. DER stands for Distinguished Encoding Rules. It is a standard encoding rule used to encode the structure of ASN.1 (Abstract Syntax Notation 1) data to be transferred between the Application Layer and the Presentation Layer of the Open Systems Interconnection (OSI). It provides a means whereby the Presentation Layer can reliably exchange any arbitrary data structure with other computer systems, while the Application Layer can map the encoded data into any type of representation or language that is appropriate for the end user. In this example, reply 406 also includes the current time, T1, from reply 404 as well as encoded data structures containing session keys for client 400 and a file server.

Client 400 receives the reply message and identifies another current time, T3. Additionally, in the depicted examples, this reply is decoded and the checksum is calculated to verify data integrity. A time difference for skew also referred to as TimeSync is identified. If the difference between T3 and T1 is less than a threshold value, such as 1 minute or 2 minutes, then the variable TimeSync is equal to T3−T2. If the difference is equal to or greater than the threshold value, then TimeSync is set equal to T3−T2−(T3−T1)/2. This calculation provides a time synchronization. This synchronization factor is used to generate time stamps in which a time stamp is set equal to the current time—TimeSync. In this manner, instead of changing physical clock settings the time stamp may be adjusted. This time stamp is placed in a request 408 sent by client 400 to another server, such as file server 410 in FIG. 4C. Additionally, the encoded data structure containing the session key for the file server is placed into request 408.

Figure 5A:
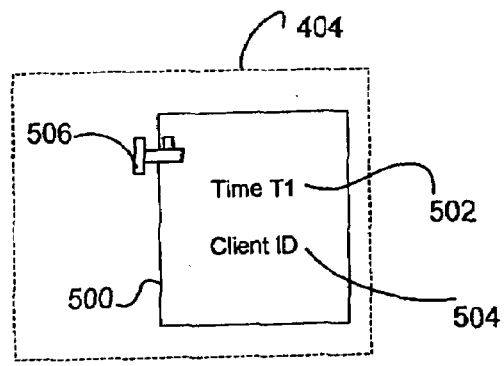
FIGS. 5A-5D are diagrams illustrating data structures used in FIGS. 4A-4C in accordance with a preferred embodiment of the present invention.
Figure 5B:
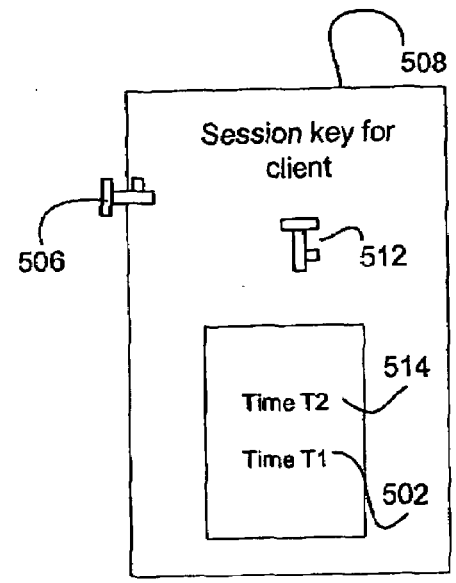
Figure 5C:
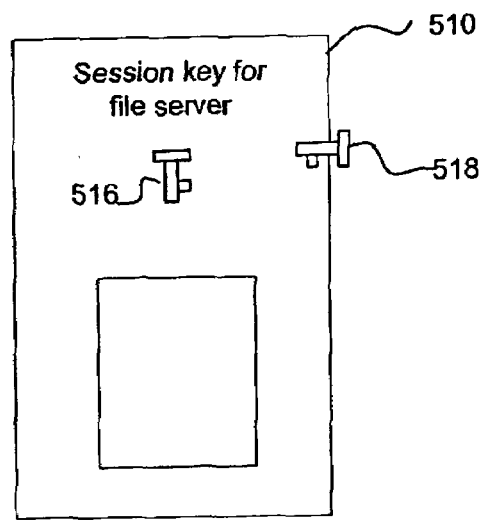

Turning next to FIGS. 5A-5D, diagrams illustrating data structures used in FIGS. 4A-4C are depicted in accordance with a preferred embodiment of the present invention. In FIG. 5A, request 404 includes an encoded data structure 500 containing current time 502, T1, from the client and a client identifier 504. This reply is encrypted using the client's secret key 506. KDC 402 in FIG. 4 generates reply 406 in FIG. 4B, which contains data structure 508 in FIG. 5B and data structure 510 in FIG. 5C. Data structure 508 includes a session key 512. Additionally, this data structure includes current time 514, T2, at KDC 402 as well as time 502, T1. Data structure 508 is encrypted using key 506. Data structure 510 includes a session key 516 for a file server, which is encoded with other information encoded in data structure 510 using key 518, which is the secret key of the file server. The client will be unable to decrypt structure 510 and will include this data structure in request 408 to file server 410 in FIG. 4.

Figure 5D:
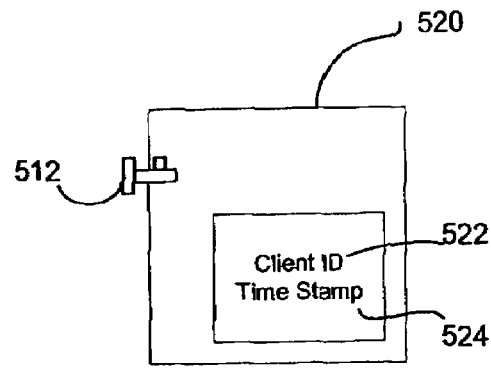

In FIG. 5D, data structure 520 is a data structure placed in request 408 in FIG. 4, which is sent to file server 410. Data structure 520 includes client ID 522 and time stamp 524. This data structure is encrypted using session key 512 from data structure 508. This data structure may be decrypted by file server 510 once file server 410 retrieves sessions key 512 from data structure 510 by decrypting the data structure using its key.

Figure 6:
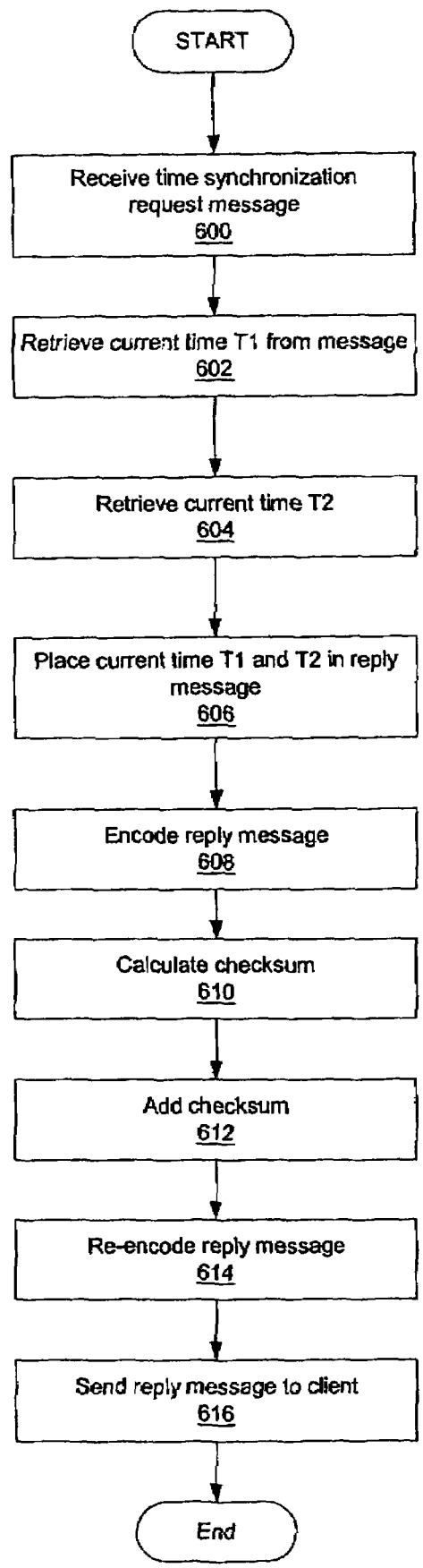
FIG. 6 is a flowchart of a process used for generating time synchronization information in accordance with a preferred embodiment of the present invention.

Turning next to FIG. 6, a flowchart of a process used for generating time synchronization information is depicted in accordance with a preferred embodiment of the present invention. The process in FIG. 6 may be implemented in a server, such as KDC server 402 in FIG. 4.

The process begins by receiving a time synchronization request message (step 600). In the depicted examples, the request is received from clients, which may generate time stamps for other requests or messages. Next, the current time, T1, from the originator of the request is retrieved (step 602). Also, the current time, T2, at the server is retrieved (step 604). Times T1 and T2 are both place in a reply message (step 606). Of course, other information may also be placed into the reply message, such as, a session key.

The reply message is then encoded (step 608). A checksum is calculated for the encoded message (step 610). The checksum is added to the reply message (step 612). The reply message is then re-encoded (step 614). This reply is then sent back to the client originating the request (step 616) with the process terminating thereafter.

Figure 7:
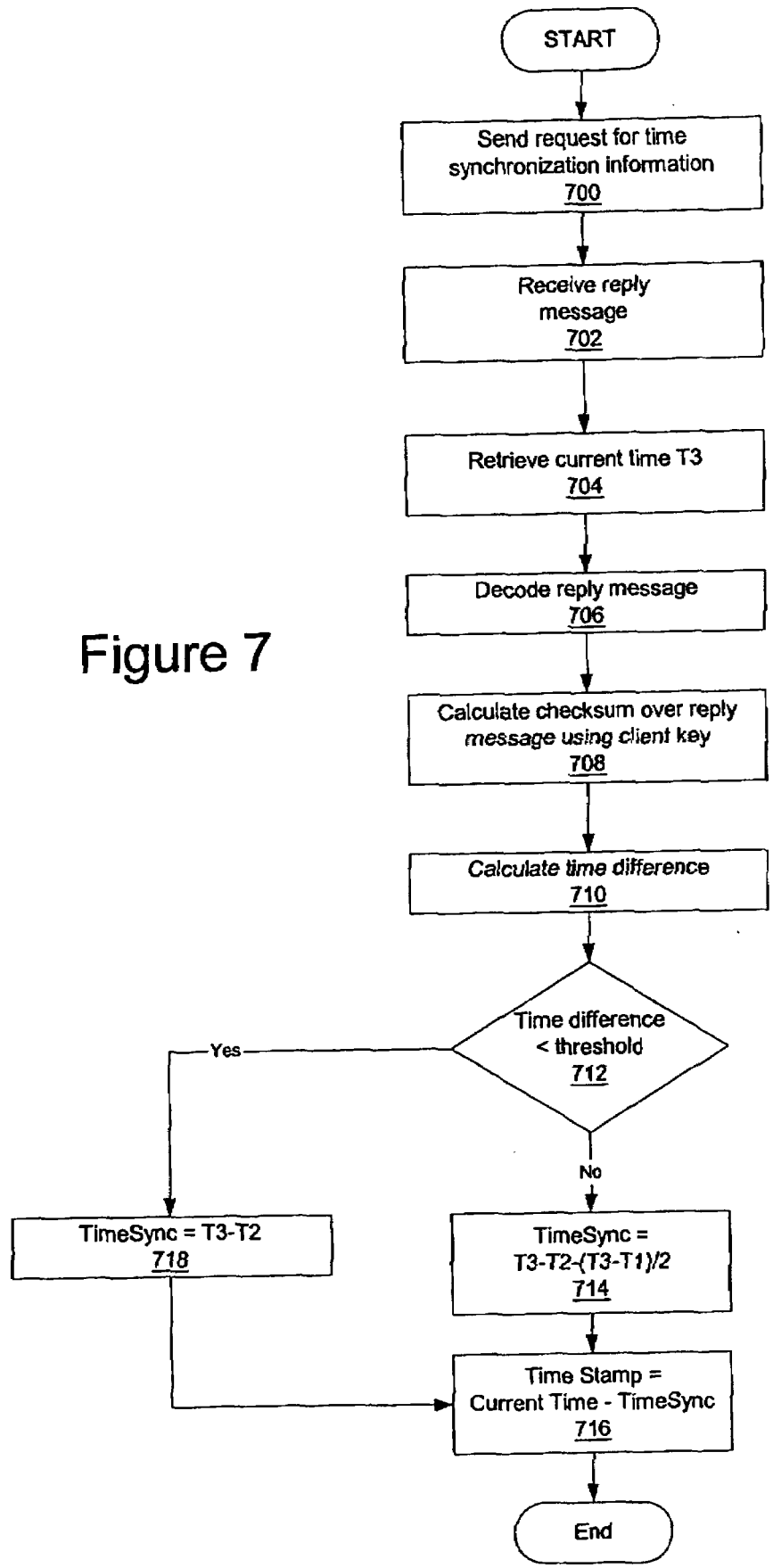
FIG. 7 is a flowchart of a process used for generating a time stamp in accordance with a preferred embodiment of the present invention.

With reference now to FIG. 7, a flowchart of a process used for generating a time stamp is depicted in accordance with a preferred embodiment of the present invention. The process illustrated in FIG. 7 may be implemented in a client, such as client 400 in FIG. 4.

The process begins by sending a request for time synchronization information (step 700). A reply message is received in response to the request (step 702). In response to receive the response message a current time, T3, at the client is retrieved (step 704). The reply message is then decoded (step 706). Next, a checksum is calculated over the reply message using a client key (step 708). A client key is used because the reply message was encrypted by the KDC server using the client key. This step is used to verify the authenticity of the reply. A time difference between current time, T3, and the time, T2, in the reply message is calculated (step 710).

Then, a determination is made as to whether the time difference is greater than some selected threshold values (step 712). This threshold value may be, for example, 1 minute or 2 minutes. Kerberos uses time stamps to guarantee that a ticket request is fresh and not replayed from a long time ago. By default, Kerberos defines "a long time ago" as 5 minutes, although this time is configurable. If the time difference is not less than the threshold, then the value TimeSync is set equal to T3−T2−(T3−T1)/2 (step 714). Then, the time stamp as generate as being equal to the current time at the client minus the value for TimeSync (step 716) with the process terminating thereafter.

With reference again the step 712, if the time difference is less than the threshold, then the value TimeSync is set equal to T3−T2 (step 718) with the process then proceeding to step 716 as described above.

Figure 8:
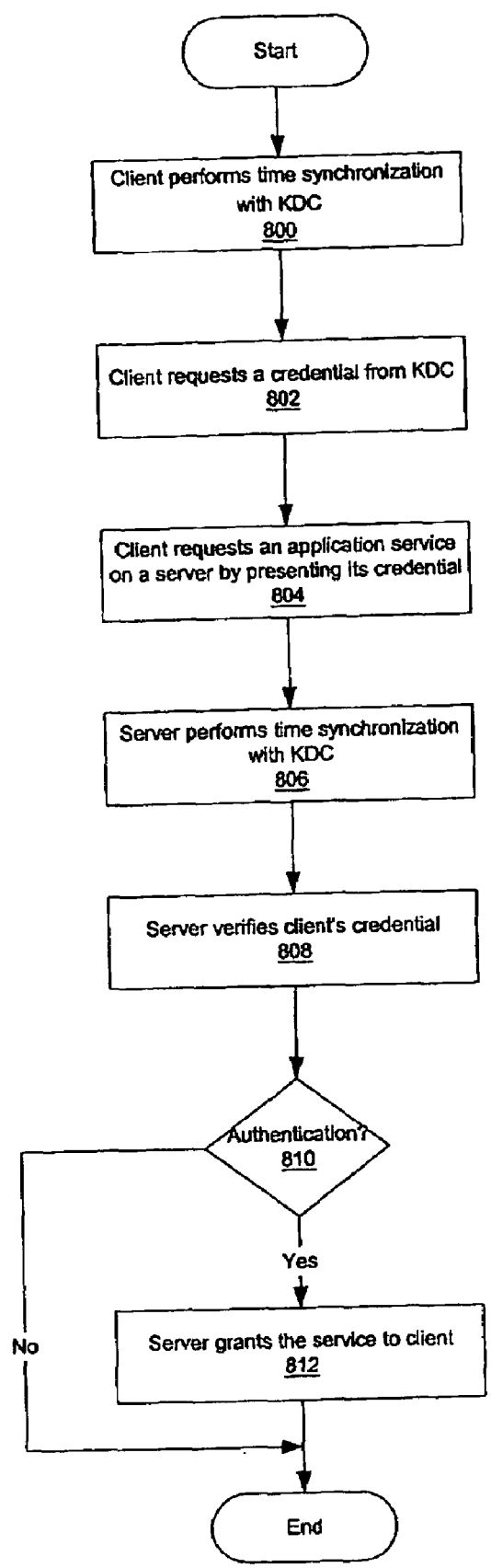
FIG. 8 is a flowchart of a process for authenticating the use of a service in accordance with a preferred embodiment of the present invention.

Turning next to FIG. 8, a flowchart of a process for authenticating the use of a service is depicted in accordance with a preferred embodiment of the present invention. The process illustrated in FIG. 8 may be implemented for use in gaining access to a server that provides a service, such as an application, e-mail, or a print service. The time synchronization process implemented by such a server is similar to that used in a client as described above. The difference is that the server performs time synchronization after it receives a server request from a client, while the client typically performs time synchronization prior to sending a credential request to a KDC.

The process begins by a client performing time synchronization with a KDC (step 800). Client then requests a credential from the KDC (step 802). Client requests an application service on a server by presenting its credential to the server (step 804). Next, server performs time synchronization with a KDC server (step 806). Server verifies client's credential (step 808).

Next, a determination is made whether the client credential is authenticated (step 810). If the credential is authenticated, the server grants the service to the client (step 812) with the process terminating thereafter. Otherwise, the process terminates without granting the service.

In these examples, networks are divided into realms to provide scalability in the Kerberos system. These divisions are often made on organizational boundaries, although they need not be. Each realm has its own KDC. Every principal registered with the same KDC belong to the same realm. The KDC for each realm is trusted by all principals registered in that realm to store a secret key in confidence. Principal is another term used in Kerberos. Kerberos principals are of several types: users, application services, such as a File server provides file access service, a printer provides print service, KDC. Cross-realm authentication allows a Kerberos user to access services in other realms. Before the user presents its credential to remote realm's KDC, time synchronization subroutine detects a KDC different from the current one, so it is invoked to do synchronization with the target KDC. The new time synchronization value is calculated, and the time stamp value is adjusted based on the new time synchronization value.

Figure 9:
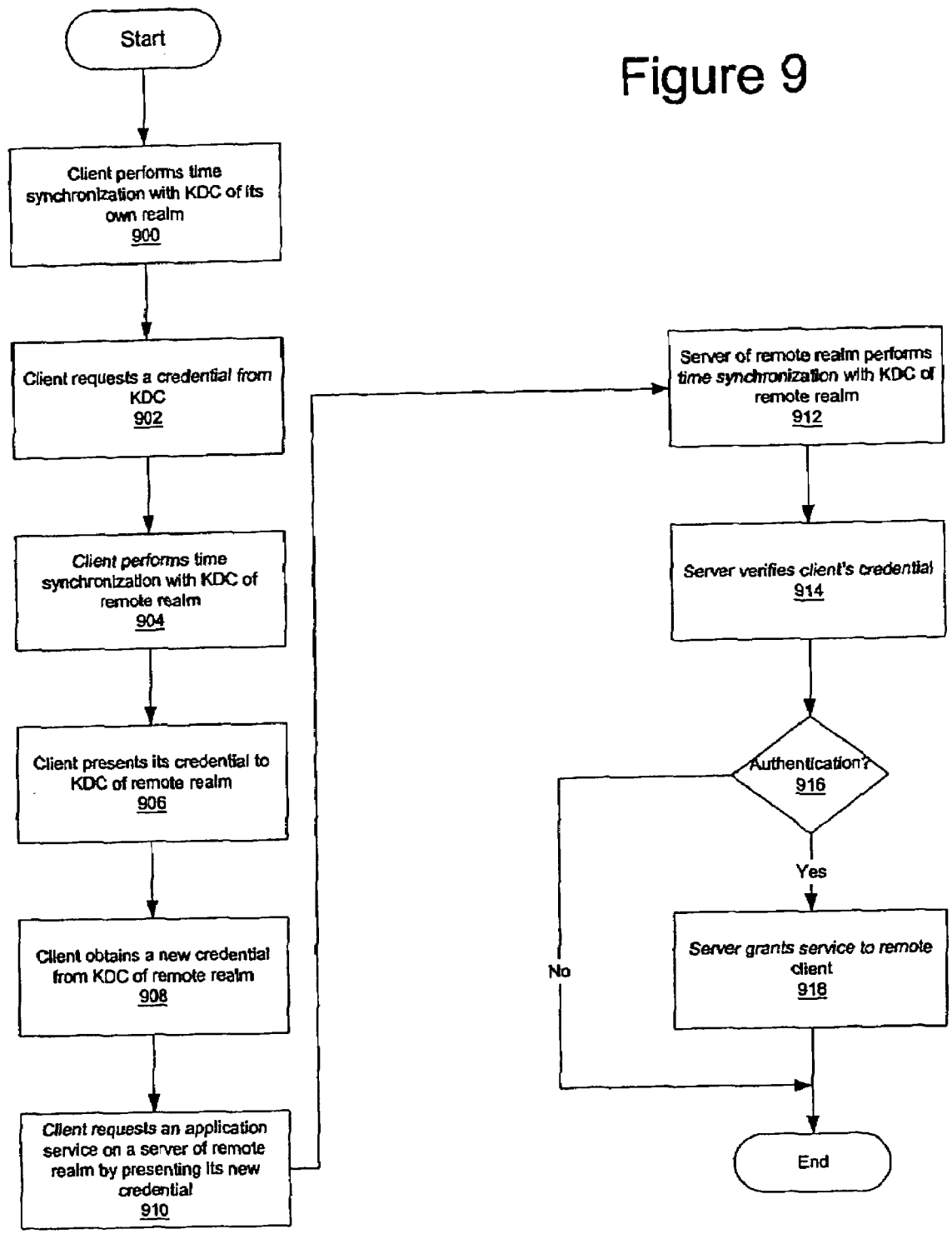
FIG. 9 is a flowchart illustrating a high level cross-realm operation in accordance with a preferred embodiment with the present invention.

Turning now to FIG. 9, a flowchart illustrating a high level cross-realm operation is depicted in accordance with a preferred embodiment with the present invention.

The process begins by the client performing time synchronization with KDC of its own realm (step 900). The client requests a credential from KDC (step 902). Next, the client performs time synchronization with KDC of remote realm (step 904). After performing time synchronization, the client presents its credential to KDC of remote realm (step 906). The client obtains a new credential from KDC of remote realm (step 908). Thereafter, the client requests an application service on a server of remote realm by presenting its new credential to the server (step 910). In response to the presentation of the credential, the server of remote realm performs time synchronization with KDC of remote realm (step 912). The server verifies the client's credential (step 914).

Next, a determination is made whether the client credential is authenticated (step 916). If the credential is authenticated, the server grants the service to the to the remote client (step 918) with the process terminating thereafter. Otherwise, the process terminates without granting the service.

Thus, the present invention a method, apparatus, and computer implemented instructions for synchronizing time between different data processing systems. Physical adjustments to clocks within a data processing system is unnecessary using the mechanism of the present invention. This mechanism avoids the dependency upon other systems or protocols to achieve synchronization of time on different processing systems. This mechanism does not rely on a time server and is dynamic in adjusting time. Further, when a client contacts servers in different network or geographic locations, time synchronization may be perform with each server being contact providing cross-realm synchronization. When a client detects a different "realm", time synchronization may be automatically initiated in which a new TimeSync value is calculated. Further, new TimeSync value may also be calculated in response to other events, such as, a periodic event signaled by a timer. In this way, potential security holes produced by altering clock settings are minimized.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROM's, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for synchronizing time in a network data processing system comprising the data processing system implemented steps of:

receiving a request for time synchronization at a target data processing system, wherein the request is received from a source data processing system;

placing a current target time at the target data processing system in a reply;

sending the reply to the source data processing system;

comparing a current source time from when the reply is received at the source data processing system to the current target time to generate a comparison;

generating a synchronization factor using the comparison; and generating a time stamp for a message using the synchronization factor and a current time in the target data processing system.

2. The method of claim 1, wherein responsive to the comparison being less than the selected threshold, the synchronization factor is determined as follows:

$$SF=T3-T2$$

wherein SF is the synchronization factor, T2 is the current target time, and T3 is the current source time when the reply is received.

3. The method of claim 1, wherein responsive to the comparison being greater than a selected threshold, the synchronization factor is determined as follows:

$$SF=T3-T2-(T3-T1)/2$$

wherein SF is the synchronization factor, T1 is a source time when the request is sent, T2 is the current target time, and T3 is the current source time when the reply is received.

4. The method of claim 1 further comprising:
storing the synchronization factor.

5. The method of claim 1, wherein the target data processing system is a key distribution center, the method further comprising:
receiving, at an application server, a request for an application service, wherein the request is received from the source data processing system;
responsive to receiving the request for the application service, performing a time synchronization between the application server and the key distribution center to generate a second synchronization factor; and
determining whether the request for the application service is authenticated, wherein the step of determining whether the request for the application service is authenticated comprises comparing the request for the application service as modified by the synchronization factor with a current time of the application server as modified by the second synchronization factor.

6. A method in a data processing system for synchronizing time, the method comprising:
sending a synchronization request to a target;
receiving a reply, wherein the reply includes a current time from the target;
identifying a clock skew using the current time from the target;
generating a time stamp for a message using the clock skew;
determining whether the server is located in a different realm from the target, prior to sending the message to the server; and
responsive to the server being located in the different realm, sending a synchronization request to a new target in the different realm; receiving a reply, wherein the reply includes a new current time from the new target; identifying a new clock skew using the current time from the new target; and generating a new time stamp for the message using the new clock skew and a current time in the target data processing system.

7. The method of claim 6, wherein the message is a request for authentication.

8. The method of claim 6, wherein the target is a key distribution center server.

9. The method of claim 6, wherein responsive to the comparison of the current time from the target to the current time for the data processing system being greater than the selected threshold, the clock skew is identified as follows:

$$CS=T3-T2$$

wherein CS is the clock skew, T2 is the current time from the target, and T3 is a current time at the data processing system when the reply is received.

10. The method of claim 6, wherein responsive to a comparison of the current time from the target to a current time for the data processing system being greater than a selected threshold, the request is sent a selected time and wherein the clock skew is determined as follows:

$$CS=T3-T2-(T3-T1)/2$$

wherein CS is the clock skew, T1 is the selected time, T2 is the current time from the target, and T3 is a current time at the data processing system when the reply is received.

11. The method of claim 10, wherein the new target is a key distribution center server.

12. The method of claim 6 further comprising: wherein the target is a key distribution center, the method further comprising:
receiving, at an application server, a request for an application service, wherein the request is received from the data processing system;
responsive to receiving the request for the application service, performing a time synchronization between the application server and the key distribution center to generate a second clock skew; and
determining whether the request for the application service is authenticated, wherein the step of determining whether the request for the application service is authenticated comprises comparing the request for the application service as modified by the clock skew with a current time of the application server as modified by the second clock skew.

13. A data processing system comprising:
a bus system;
a communications unit connected to the bus, wherein data is sent and received using the communications unit;
a memory connected to the bus system, wherein a set of instructions are located in the memory; and
a processor unit connected to the bus system, wherein the processor unit executes the set of instructions to send a synchronization request to a target; receive a reply, wherein the reply includes a current time from the target; to identify a clock skew using the current time from the target; and to generate a time stamp for a message using the clock skew and the current time in the target.

14. The data processing system of claim 13, wherein the bus system includes a primary bus and a secondary bus.

15. The data processing system of claim 13, wherein the processor unit includes a plurality of processors.

16. The data processing system claim 13, wherein the communications unit is an Ethernet adapter.

17. The data processing system of claim 13, where in the processor unit further executes the set of instructions to identify the clock skew using the current time from the target, wherein responsive to a comparison of the current time from the target to a current time for the data processing system being greater than a selected threshold, the clock skew is generated as follows: CS=T3−T2−(T3−T1)/2, wherein CS is the clock skew, T1 is a time for the data processing system when the request is sent, T2 is the current time from the target, and T3 is the current time for the data processing system when the reply is received.

18. A network data processing system for synchronizing time comprising:
   receiving means for receiving a request for time synchronization at a target data processing system, wherein the request is received from a source data processing system;
   placing means for placing a current target time at the target data processing system in a reply;
   sending means for sending the reply to the source data processing system;
   comparing means for comparing a current source time from when the reply is received at the source data processing system to the current target time to generate a comparison; and
   generating means for generating a synchronization factor using the comparison, and
   second generating means for generating a time stamp for a message using the synchronization factor and a current time in the target data processing system.

19. The network data processing system of claim 18, wherein responsive to the comparison being less than the selected threshold, the synchronization factor is determined as follows:

$$SF=T3-T2$$

wherein SF is the synchronization factor, T2 is the current target time, and T3 is the current source time when the reply is received.

20. The network data processing system of claim 18, wherein responsive to the comparison being greater than a selected threshold, the synchronization factor is determined as follows:

$$SF=T3-T2-(T3-T1)/2$$

wherein SF is the synchronization factor, T1 is a source time when the request is sent, T2 is the current target time, and T3 is the current source time when the reply is received.

21. The network data processing system of claim 18 further comprising:
   storing the synchronization factor.

22. The network data processing system of claim 18, wherein the receiving means, placing means, and sending means are located in the target data processing system and wherein the comparing means and the generating means are located in the source data processing system.

23. The network data processing system of claim 18, wherein the target data processing system is a key distribution center, the method further comprising:
   receiving means for receiving, at an application server, a request for an application service, wherein the request is received from the source data processing system;
   responsive to receiving the request for the application service, synchronization means for performing a time synchronization between the application server and the key distribution center to generate a second synchronization factor; and
   determining means for determining whether the request for the application service is authenticated, wherein the step of determining whether the request for the application service is authenticated comprises comparing the request for the application service as modified by the synchronization factor with a current time of the application server as modified by the second synchronization factor.

24. A data processing system for synchronizing time, the data processing system comprising:
   sending means for sending a synchronization request to a target;
   receiving means for receiving a reply, wherein the reply includes a current time from the target;
   identifying means for identifying a clock skew using the current time from the target; and
   generating means for generating a time stamp for a message using the clock skew and a current time in the target.

25. The data processing system of claim 24, wherein the sending means is a first sending means and further comprising:
   second sending means for sending the message to a server.

26. The data processing system of claim 25 further comprising:
   determining means for determining whether the server is located in a different realm from the target, prior to sending the message to the server; and
   execution means, responsive to the server being located in the different realm, for sending a synchronization request to a new target in the different realm; receiving a reply, wherein the reply includes a new current time from the new target; identifying a new clock skew using the current time from the new target; and generating a new time stamp for the message using the new clock skew.

27. The data processing system of claim 26, wherein the new target is a key distribution center server.

28. The data processing system of claim 24, wherein the target is a key distribution center server.

29. The data processing system of claim 24, wherein responsive to the comparison of the current time from the target to the current time for the data processing system being greater than the selected threshold, the clock skew is identified as follows:

$$CS=T3-T2$$

wherein CS is the clock skew, T2 is the current time from the target, and T3 is the current time at the data processing system when the reply is received.

30. The data processing system of claim 24, wherein responsive to the comparison being greater than a selected threshold, the request is sent a selected time and wherein the clock skew is determined as follows:

$$CS=T3-T2-(T3-T1)/2$$

wherein CS is the clock skew, T1 is the selected time, T2 is the current time from the target, and T3 is a current time at the data processing system when the reply is received.

31. The data processing system of claim 24 further comprising:
   receiving means for receiving, at an application server, a request for an application service, wherein the request is received from the source data processing system;
   responsive to receiving the request for the application service, synchronization means for performing a time synchronization between the application server and the key distribution center to generate a second synchronization factor; and
   determining means for determining whether the request for the application service is authenticated, wherein the step of determining whether the request for the application service is authenticated comprises comparing the request for the application service as modified by the synchronization factor with a current time of the application server as modified by the second synchronization factor.

32. A computer readable recording medium storing a computer program for synchronizing time in a network data processing system, wherein the computer program product:
- first instructions for receiving a request for time synchronization at a target data processing system, wherein the request is received from a source data processing system;
- second instructions for placing a current target time at the target data processing system in a reply;
- third instructions for sending the reply to the source data processing system;
- fourth instructions for comparing a current source time from when the reply is received at the source data processing system to the current target time to generate a comparison; and
- fifth instructions for generating a synchronization factor using the comparison and the current target time.

33. A computer readable recording medium storing a computer program for synchronizing time, the computer program product comprising:
- first instructions for sending a synchronization request to a target;
- second instructions for receiving a reply, wherein the reply includes a current time from the target;
- third instructions for identifying a clock skew using the current time from the target; and
- fourth instructions for generating a time stamp for a message using the clock skew and the current time from the target.

* * * * *